Oct. 29, 1946.   A. M. TROGNER   2,410,253
OPERATING MECHANISM FOR ELECTRICAL SWITCHES
Filed Aug. 2, 1940   6 Sheets-Sheet 1
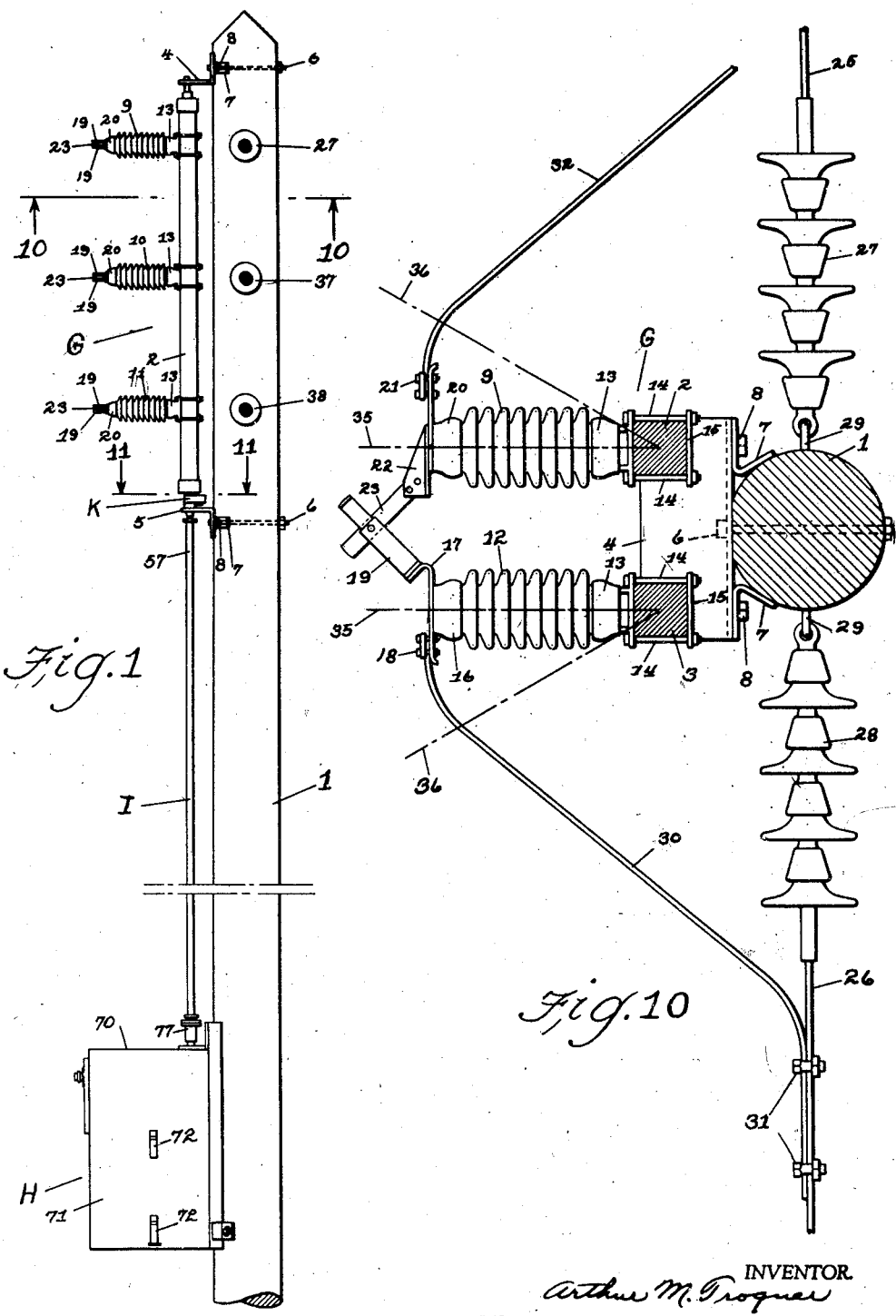
INVENTOR.
Arthur M. Trogner
BY Chester W. Brown
ATTORNEY.

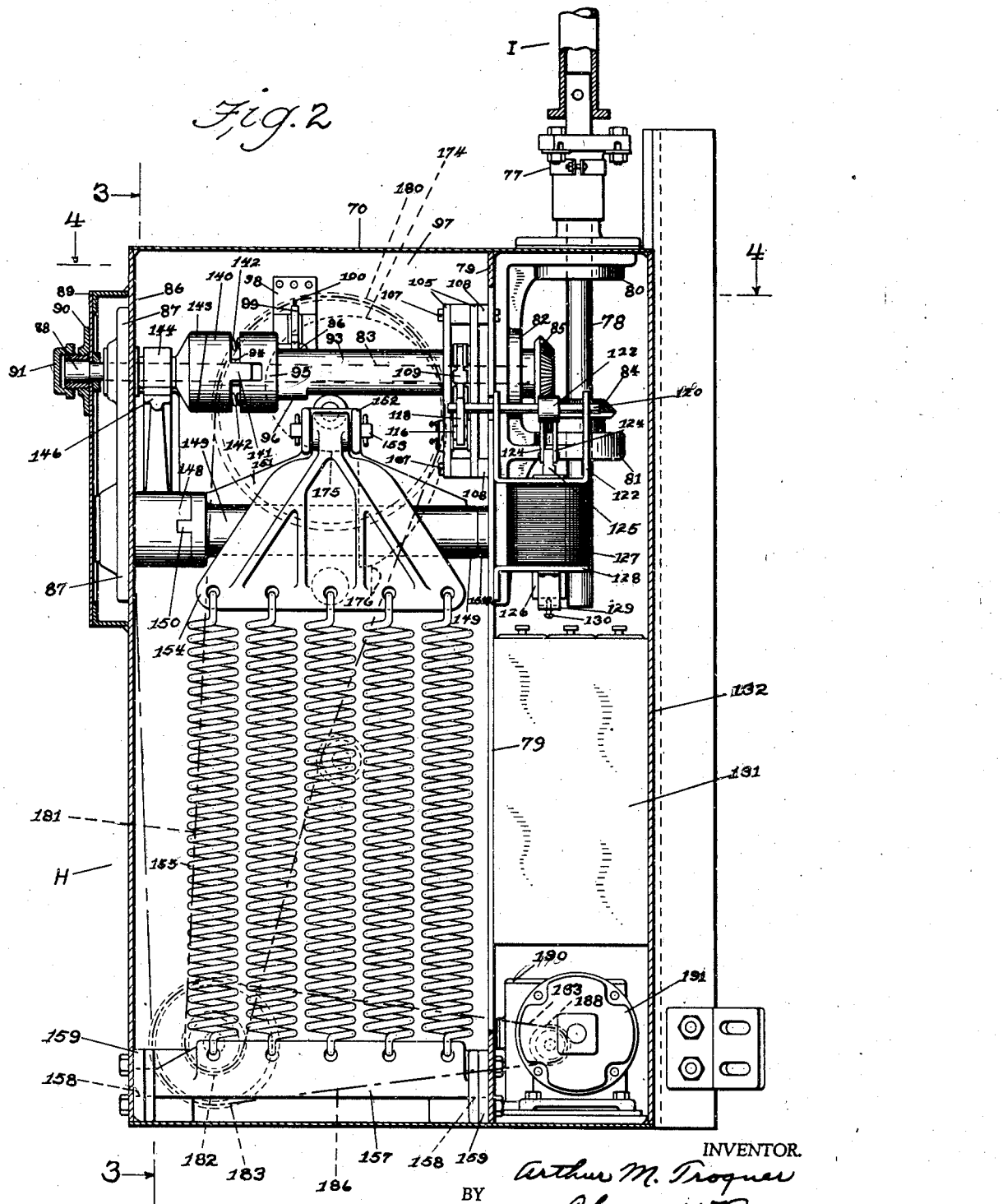

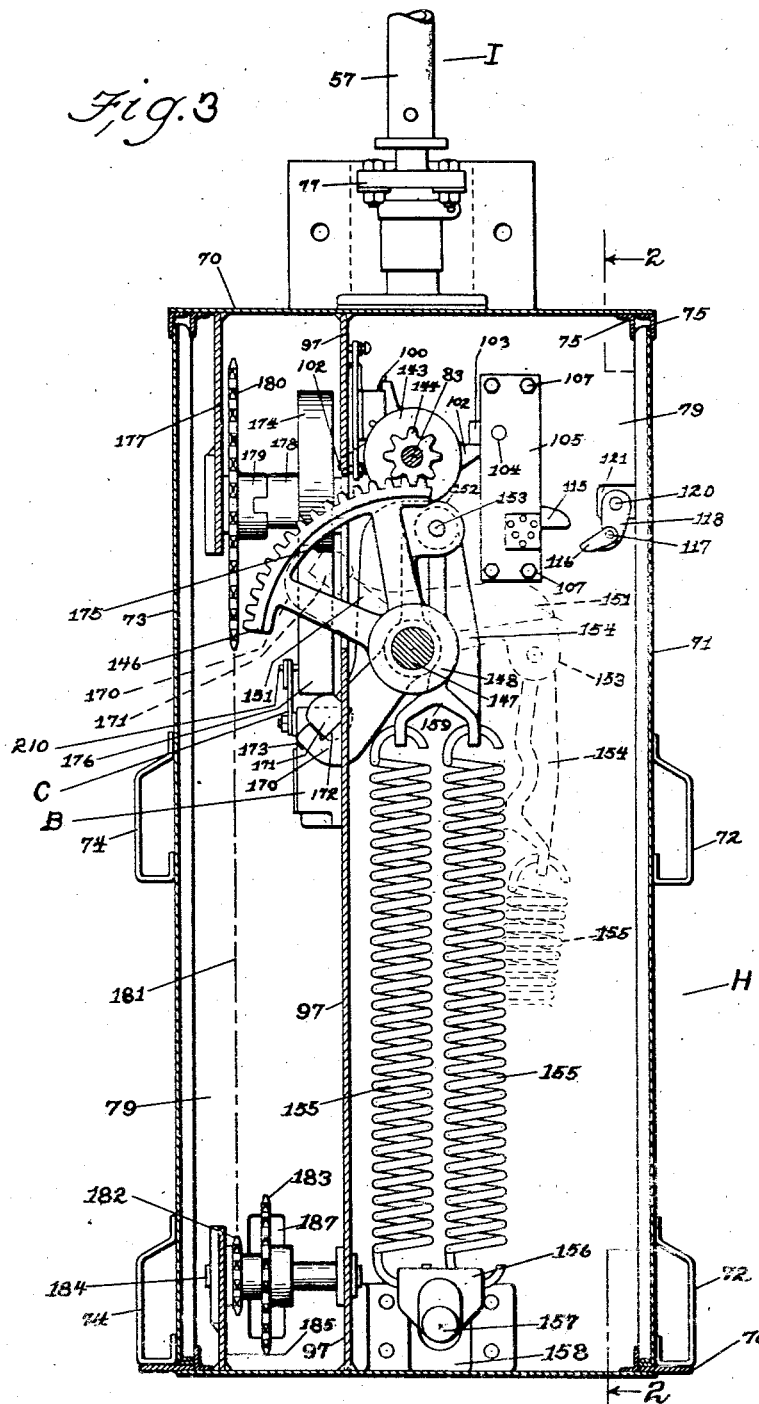

Oct. 29, 1946. A. M. TROGNER 2,410,253
OPERATING MECHANISM FOR ELECTRICAL SWITCHES
Filed Aug. 2, 1940 6 Sheets-Sheet 4
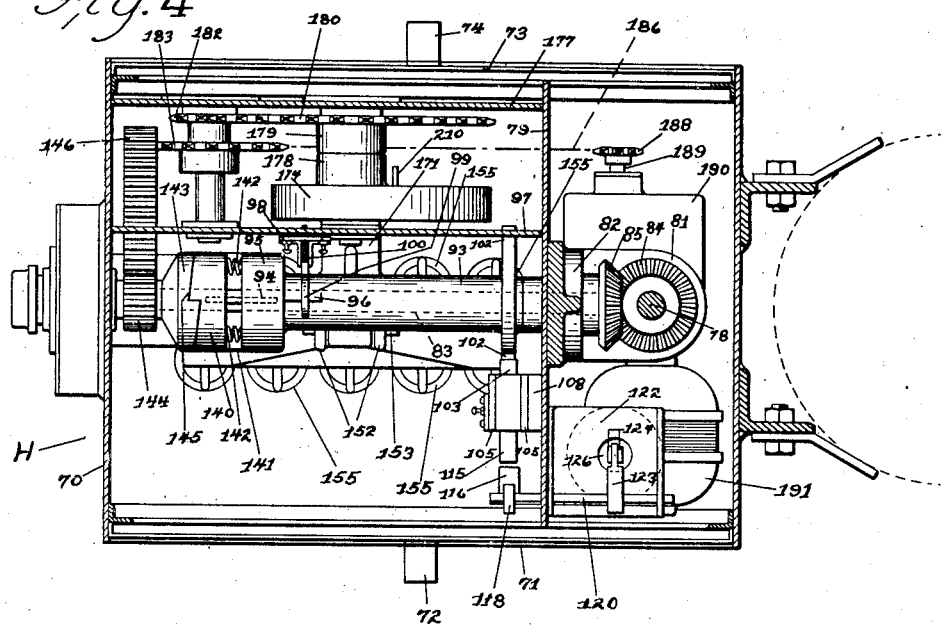
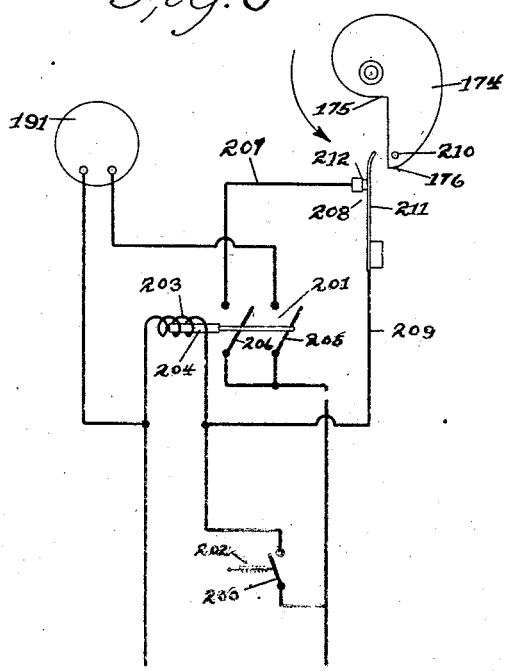
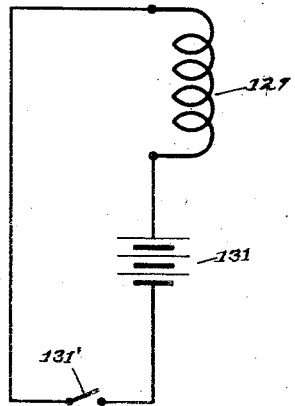
INVENTOR.
Arthur M. Trogner
Chester W. Brown
BY
ATTORNEY.

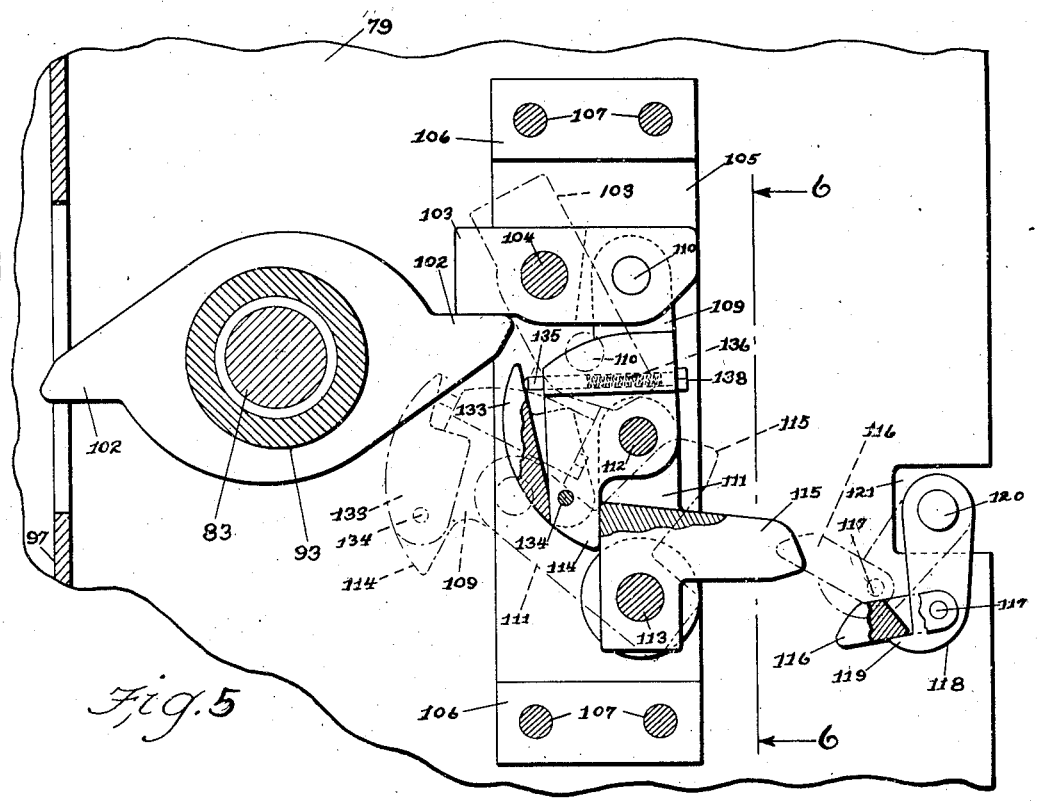

Oct. 29, 1946.                A. M. TROGNER                2,410,253
                OPERATING MECHANISM FOR ELECTRICAL SWITCHES
                    Filed Aug. 2, 1940          6 Sheets-Sheet 6
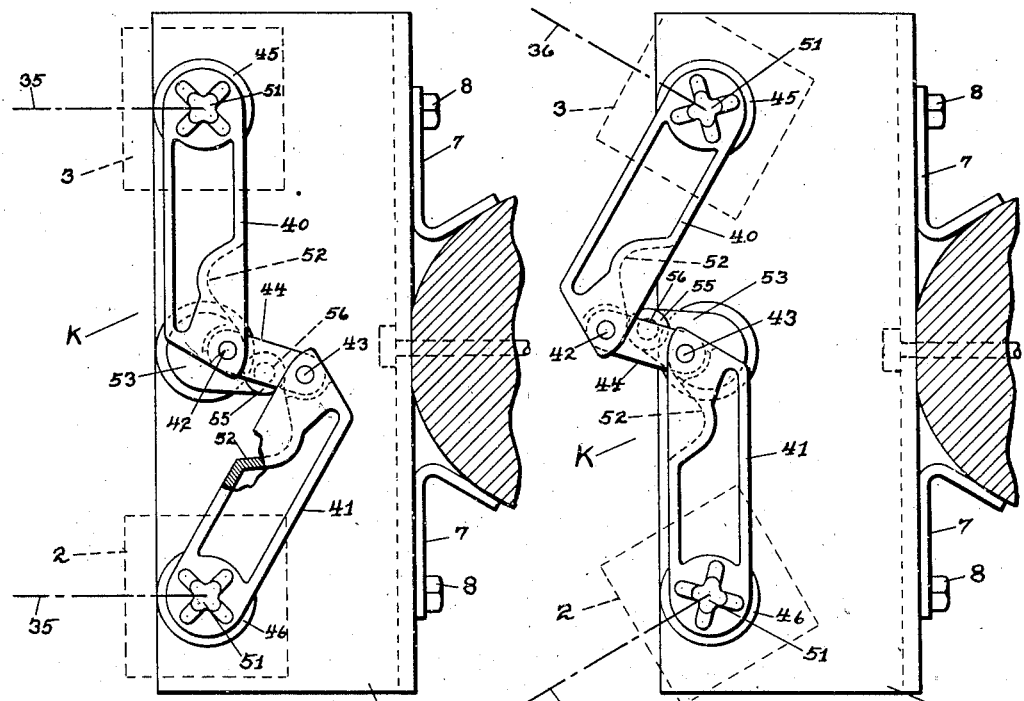
*Fig. 11*                                              *Fig. 12*
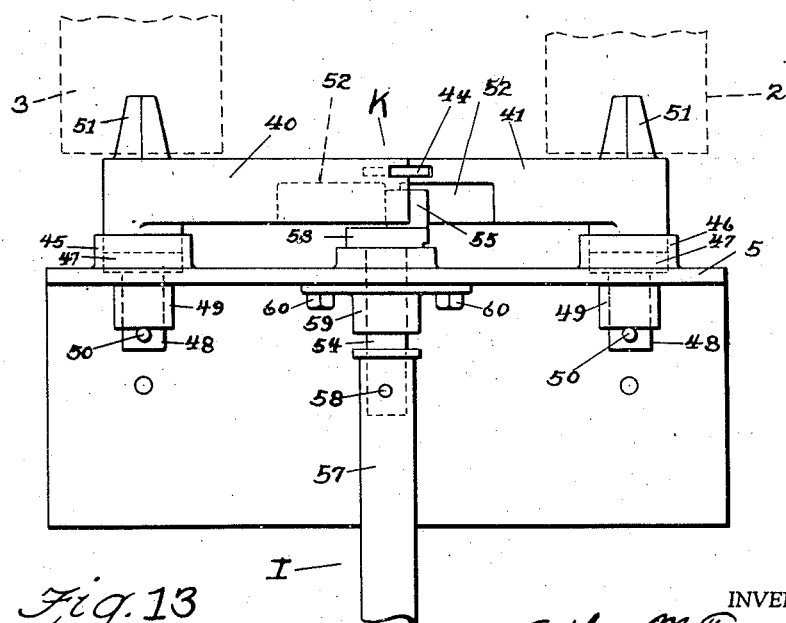
*Fig. 13*
INVENTOR.
Arthur M. Trogner
BY Chester W. Brown
ATTORNEY.

Patented Oct. 29, 1946

2,410,253

UNITED STATES PATENT OFFICE 2,410,253

OPERATING MECHANISM FOR ELECTRICAL SWITCHES

Arthur M. Trogner, East Stroudsburg, Pa., assignor to Line Material Company, Milwaukee, Wis., a corporation of Delaware Application August 2, 1940, Serial No. 350,036

16 Claims. (Cl. 185—40)

1

This invention relates to improvements in operating mechanism for electrical switches.

The primary object of this invention is to provide for an electrical switch, power operated mechanism for alternately opening and closing the switch, such mechanism being controlled at a point remote from the switch.

Another object is to provide power operated mechanism including stored energy means controlled by releasable locking mechanism which is operative to stop the power operated mechanism upon the completion of each switch opening and closing movement.

It is also an object to provide power operated mechanism in which the stored energy means may be reset after utilization of the energy during switch operation, the resetting of the stored energy means being controllable at a point remote from the mechanism.

More specifically, it is an object to provide switch operating means which may be manually or mechanically operated and including stored energy means which may be released at the will of the attending workman, which will automatically cease to deliver power upon completion of each cycle of switch opening or closing movement, and which may be operated to secure its maximum store of energy, the storing operations automatically ceasing when the maximum is reached.

In the drawings:

Fig. 1 is a view in front elevation of an embodiment of my invention mounted on a pole. It will be understood that this figure is diagrammatic rather than detailed.

Fig. 2 is an enlarged sectional view in front elevation of the switch operating device shown in Fig. 1 and taken on the line 2—2 of Fig. 3.

Fig. 3 is an enlarged sectional view in side elevation of the switch operating device shown in Fig. 1 and taken on the line 3—3 of Fig. 2.

Fig. 4 is an enlarged sectional view in top plan view of the switch operating device shown in Fig. 1 and taken on the line 4—4 of Fig. 2.

Figs. 5, 6, and 7 are enlarged detail views, partly in section, of portions of the control mechanism for the switch operating device.

Fig. 8 is a diagrammatic view of an electric circuit for releasing the switch operating mechanism.

Fig. 9 is a diagrammatic view of an electric circuit for controlling the resetting of the switch operating mechanism.

Fig. 10 is an enlarged detail view of the switch shown in Fig. 1 and taken on the line 10—10 of Fig. 1.

Figs. 11, 12, and 13 are enlarged detail views partly in section of the switch operating lever mechanism. Figs. 11 and 12 are taken on the line 11—11 of Fig. 1.

2

Throughout the several views like parts are identified by the same reference characters.

An embodiment of my invention, shown in Fig. 1, comprises a gang switch designated in its entirety by the letter G, switch operating mechanism enclosed in a housing and designated generally by the letter H, and a rotatable shaft I connecting the switch operating mechanism and the switch. As indicated, the switch G is mounted on the upper end of the pole 1 and the switch operating mechanism H is mounted on the pole 1 below the switch, the shaft I extending vertically of the pole.

*Gang switch mechanism*

The illustrated switch G is of the so-called gang type wherein three electric lines of a three phase circuit are simultaneously interrupted when the switch is operated. However, it will be understood that I do not limit the use of this invention to a three phase circuit, since obviously it may, if desired, be utilized in connection with a single electric line as well as a plurality of lines.

The illustrated switch comprises a pair of vertical insulating bars 2 and 3 which are substantially parallel and rotatably supported at opposite ends by means of the L-shaped brackets 4 and 5 secured to the pole in a suitable manner as by bolts 6 extending through the pole 1. Suitable bracing members 7 are provided on each bracket 4 and 5 adapted to hold the brackets substantially rigidly in position and secured to the bracket by means of bolts 8.

The insulating bar 2 supports three cylindrical insulators 9, 10, and 11 in vertically spaced relation. Similarly, the insulating bar 3 is provided with three insulators, only one of which is shown at 12 in Fig. 10. Each insulator 9, 10, 11, and 12 is secured to its respective bar by means of brackets 13, bolts 14, and plates 15.

Each of the insulators 12 on the bar 3 (see Fig. 10) is provided at its outer end with a bracket 16 including an angle portion 17 and terminal portion 18. Mounted on the angle portion 17 is a pair of parallel switch blades 19, the upper ends of which are shown projecting above the insulators 9, 10, and 11 in Fig. 1.

Each of the insulators 9, 10, and 11 on the bar 2, is provided with a bracket 20 at its outer end including a terminal portion 21 and a blade mounting portion 22. Secured to the mounting portion 22 is a single switch blade 23 which extends between and contacts with the blades 19 on the insulators 12, as indicated in Fig. 1.

The conductors 25 and 26 are respectively dead ended in insulator strings 27 and 28 which are mounted on the pole 1 by means of eye bolts 29. The conductor 26 is electrically connected by means of a flexible wire 30 connected to the conductor at 31 and to the terminal portion 18 on the switch. The conductor 25 is connected (not shown) to the flexible wire 32 in a similar manner to that illustrated at 31 and to the terminal portion 21 on the switch.

It will be obvious that when the switch G is in the position shown in Fig. 10 the conductors 25 and 26 are electrically connected through the flexible wires 30 and 32 and the switch blades 19 and 23. The broken lines 35 indicate the closed position of the switch G and the broken lines 36 indicate the open position of the switch. As will be more fully described hereafter, the insulating bars 2 and 3 are rotated simultaneously in opposite directions, thus alternately opening and closing the switch.

It will be understood that Fig. 10 shows the uppermost line wire arrangement of the Fig. 1 disclosure. Since the intermediate line wires positioned at 37 in Fig. 1 and the lowermost line wires positioned at 38 in Fig. 1 are connected in a manner identical to that shown in Fig. 10, it is unnecessary to duplicate the illustration.

Figs. 11, 12, and 13 illustrate a novel link and shaft connection for operating the switch. The link mechanism is designated generally by the letter K and its position in Fig. 1 is similarly indicated. The insulating bars 2 and 3 are indicated by means of broken lines.

As indicated, the link mechanism K is carried on the upper side of the bracket 5 and comprises a pair of lever arms 40 and 41 and pivotally connected respectively at 42 and 43 with a link 44. The lever arms 40 and 41 are respectively socketed in the bracket 5 at 45 and 46 for rotation on bearing means 47, such as ball bearings (not shown). The bearing means 47 is retained in position by means of a shank 48 projecting through the bracket 5 and engaged by a collar 49 and pin 50. Each of the lever arms 40 and 41 is provided with a cross-like wedge portion 51 concentrically related to the sockets 45 and 46 and respectively engaged with the insulating bars 3 and 2 to produce rotation thereof with the lever arms 40 and 41.

The lever arms 40 and 41 as illustrated are identical and each is provided with a camming groove 52. Midway between the sockets 45 and 46, a camming arm 53 is rotatably mounted by means of a stub shaft 54. The outer camming end of the arm 53 is provided with roller 55 mounted on pin 56 for alternate engagement with the camming grooves 52 on the lever arms 40 and 41. The stub shaft 54 which constitutes a part of the shaft I projects into the tube 57, also a part of the shaft I, and is secured for rotation therewith by means of pin 58. Additional bearing surface for the stub shaft 54 is provided by means of the sleeve 59 secured to the bracket 5 by means of bolts 60.

It will be apparent that whenever the camming roller 55 is positioned in either of the positions illustrated in Figs. 11 and 12, the switch will be held in open or closed positions, as the case may be, by reason of the engagement of the camming roller with the lever arms 40 and 41, as shown. Figs. 11 and 13 indicate the closed position of the switch and Fig. 12 the open position.

The switch is operated by always rotating the shaft I in a counter-clockwise direction relative to Figs. 11 and 12. Assuming that the switch is in closed position, as indicated in Fig. 11, then to open the switch the shaft I is rotated to cause the camming roller 55 to move over the surface of the camming groove 52 on the lever arm 40. As this movement continues, the lever arm 40 is caused to move to the position shown in Fig. 12. Since the arm 40 is connected to the arm 41, the arm 41 is caused, by the movement of the arm 40, to move to the position shown in Fig. 12.

If rotation of the shaft I continues through 360 degrees, the camming roller 55 will be carried past the position shown in Fig. 12 and back to the position shown in Fig. 11. In such case, the roller 55 will move over the surface of the camming groove 52 on the lever 41 and thereby cause the arms 40 and 41 to move from the positions shown in Fig. 12 to the positions shown in Fig. 11.

As previously stated, the insulating bars 2 and 3 are respectively rotatable with the arms 41 and 40 and consequently assume the positions shown in Fig. 11 when the switch is closed and the positions shown in Fig. 12 when the switch is open. It will be apparent that to operate the switch it is necessary to always rotate the shaft I in a counter-clockwise direction. Therefore, as will be hereafter fully disclosed, mechanism is provided for rotating the shaft I in one direction only and preventing accidental rotation in the opposite direction.

Switch operating mechanism

Figs. 2, 3, and 4 show the switch operating mechanism interiorly of the casing 70 of the mechanism denoted at H in Fig. 1. As indicated in Fig. 3, the casing is provided on one side with a removable cover 71 having handles 72 and on the opposite side with a similar removable cover 73 having handles 74. Fig. 1 shows the cover 71.

Each of the covers slides at the upper end into a channel formed by the angle irons 75 secured to the top of the casing and is supported at the lower end by means of a T-bar 76 secured to the bottom of the casing.

The tube 57 of the shaft I is connected at its lower end to a coupling device 77 immediately above the casing 70 and may be of any suitable arrangement adapted to allow for slight misalignment of the shaft I and shaft 78 to which the coupling is attached. Detail of the coupling is not shown since such devices are well known in the art.

Secured in any suitable manner (not shown) to the upper end of the division wall 79 in the casing 70, is a U-bracket which provides a bearing 80 for the shaft 78 adjacent the top of the casing and a bearing 81 for the shaft 78 spaced from and below the bearing 80. Intermediate the bearings 80 and 81, the bracket is provided with a bearing 82 having its axis normal to the axis of shaft 78 supporting one end of the horizontal shaft 78. Shafts 78 and 83 are connected by means of bevel gears 84 and 85. Shaft 83 extends from the bearing 82 through the division wall 79 and the side 86 of the casing 70 where it is journaled in the bearing bracket 87 secured to the outerside of the wall in any suitable manner (not shown). The end 88 of the shaft 83 projects beyond the bearing bracket 87 and is provided with a socket (not shown) for receiving a hand crank (not shown). Thus the shaft may be manually rotated in a counter-clockwise direction relative to Fig. 4 and by reason of its connection with shaft I produce a similar rotation of the camming roller 55 relative to Figs. 11 and 12.

The projecting end 88 of the shaft 83 is housed by cover 89, hub 90 and cap 91 which is threaded on the hub for removal when it is desired to manually rotate the shaft 83.

Mounted on the shaft 83 is a sleeve 93 which is secured thereto for rotation therewith by means of a key 94 at the flanged end 95 of the sleeve 93. The sleeve is provided on its outer periphery adjacent the flanged end 95 with a pair of latching lugs 96 disposed on opposite sides of the sleeve relative to each other. Fig. 7 shows the detail of this construction as viewed from the same position as Fig. 3. The division wall 97 supports a bracket 98 on which is a catch lever 99 pivotally mounted for engagement alternately with the latching lugs 96 on the sleeve 93. A spring 100 carried by the bracket 98 urges the catch lever 99 into position for engagement with the lugs 96. The lugs 96 are constructed so that the lever 99 will cam thereover when the shaft 83 is rotated counter-clockwise relative to Fig. 4 and positively engage the lugs when the shaft 83 tends to rotate in a clockwise direction. Thus, it will be apparent that the shaft 83 can rotate in one direction only and thus prevents inadvertent clockwise rotation of the camming roller 55 relative to Figs. 11 and 12. The ratio of the bevel gears 84 and 85 is such that 180 degrees of rotation of the shaft 83 will produce a like degree of rotation of the camming roller 55.

*Releasable latching mechanism for the shaft 83*

In addition to the mechanism previously described for preventing improper rotation of the shaft 83, there is also provided releasable latching mechanism for normally preventing the proper rotation of the shaft. This releasable latching mechanism comprises a pair of lugs 102 on the sleeve 93 and disposed upon opposite sides thereof relative to each other. (Figs. 5 and 6 show detail of the releasable latching mechanism, Fig. 5 being viewed from the same position as Fig. 3 and Fig. 6 being viewed from the same position as Fig. 2.)

Normally one or the other of the lugs 102 engage the lever 103 which is pivotally mounted on pin 104 supported by and between the parallel side bars 105. The bars 105 are spaced by means of blocks 106 on the ends thereof. The bars 105 and blocks 106 thus in effect comprise a housing for the releasable latching mechanism hereafter more fully described and are secured to the division wall 79 by means of bolts 107. Spacing blocks 108 are disposed between the wall 79 and housing for the latching mechanism.

Normally the lever 103 is held against rotation by means of toggle mechanism comprising a link 109 pivotally connected at 110 with the lever 103 and at the opposite end with the link 111 at 112. In turn the link 111 is pivotally mounted on pin 113 which is supported between and by the bars 105. As may be seen from Fig. 6, the lever 103 is bifurcated to receive the link 109 and that the link 111 is also bifurcated to receive the link 109.

The link 109 is provided with a finger 114 which projects downwardly below the pivot 112 and engages the link 111. When the finger 114 thus engages the link 111, the axis of the pivot 112 is positioned slightly to the right of a plane common to the axes of pivots 110 and 113 as viewed from Fig. 5 or Fig. 2. Thus any pressure transmitted through the lug 102 on the sleeve 93, tending to rotate the lever 103, will be countered by the toggle mechanism 109—111 and the shaft 83 will be held against counter-clockwise motion.

It will be noted that the link 111 is provided with a finger 115 projecting laterally thereof. This finger is disposed in the path of movement of the releasing finger 116 pivotally carried at 117 by the lever 118. A stop 119 is provided on the lever 118 for normally holding the finger 116 in the position indicated. The lever 118 is secured to the shaft 120 which extends through the slot 121 in the division wall 79.

Upon the opposite side of the wall 79 (see Figs. 2 and 4) is provided a U-bracket 122 secured thereto in any suitable manner (not shown). The shaft 120 is journaled for rotation in the U-bracket arms. Secured to the shaft 120 between the U-bracket arms is a lever 123 to the outer end of which a pair of parallel links 124 are pivotally connected. The lower ends of the links 124 are pivotally connected with a plunger 125 including a solenoid core 126 which extends through the base of the U-bracket and the solenoid winding 127 beneath the bracket 122. The solenoid winding 127 is supported by the L-bracket 128 which is secured to the division wall 79 in any suitable manner (not shown). As indicated in Fig. 2, the L-bracket 128 is provided with a stop 129 for limiting the downward movement of the core 126, the stop 129 in turn being provided with a screw 130 for manually varying the extent of the downward movement of the core 126.

Fig. 8 shows an electric circuit (diagrammatically) for controlling the solenoid 126—127. When the switch 131' closes the circuit through the solenoid winding 127, the core 126 (Fig. 2) will be drawn upwardly and through the links 124 and lever 123 to cause the shaft 120 to rotate in a clockwise direction relative to Figs. 3 and 5. When the shaft 120 is thus rotated the finger 116 will engage the finger 115 on the toggle link 111, causing the toggle to collapse. When the toggle mechanism has collapsed the lever 103 will move out of the path of the lug 102 on the sleeve 93 and free the shaft 83 for counter-clockwise movement relative to Figs. 2 and 5 and a corresponding movement of the cam roller relative to Figs. 11 and 12.

Fig. 2 shows a storage battery 131 supported between walls 79 and 132 in any suitable manner not illustrated. This battery is diagrammatically shown in the circuit in Fig. 8. For the sake of clarity, this battery is not shown in Fig. 4.

When the toggle 109—111 has been broken as indicated, it and the lever 103 will assume the position illustrated in broken lines in Fig. 5 and upon rotation of the shaft 83, the lug 102 at the left of the view will be moved into contact with the arcuate plate 133. Continued rotation of the shaft will cause the toggle 109—111 to be reset. The plate 133 is pivoted at 134 on the link 109 and engages the pin 135 which is spring pressed outwardly against the plate 133 by spring 136, the pin and spring being socketed in the link 109. A plug 138 closes one end of the socket. Thus the lugs may move freely by the plate 133 and into contact with the latched lever 103 and at the same time insuring the proper resetting of the toggle.

*Stored energy mechanism for automatically energizing the switch operating mechanism*

Mounted on the shaft 83 in the housing 70, is a clutch member 140 which is held against rotation thereon by the key 94, shown in Fig. 4, and is splined 141 to the flanged end 95 on the sleeve 93, as shown in Fig. 2. This clutch member is slidable on the shaft 83 toward the sleeve 93 and is normally held in the position indicated by means of the coil springs 142, and when in this position engages the clutch member 143.

Clutch member 143 is secured to the pinion 144 and both are rotatable as a unit in a clockwise direction on the shaft 83 as viewed from Fig. 3. When so rotated the camming clutch jaws 145 clearly shown in Fig. 4 cause the clutch member 140 to move axially of the shaft 83 against the coil springs 142. When the clutch member 143 and pinion 144 rotate in the opposite direction the members 143 and 140 positively engage through the jaws 145 and prevent further rotation in that direction relative to the shaft 83.

The pinion 144 meshes with a gear segment 146 which is mounted on the shaft 147 and has its hub 148 secured to the elongated hub 149 in any suitable manner such as by splining 150. The shaft 147 is journaled at its ends (not shown) in bearing bracket 87 and hub 151A on the division wall 79. An arm 151 which is an integral part of the hub 149, extends upwardly therefrom and terminates in a bifurcated end 152 which projects over the hub and is provided with a pivot pin 153 disposed to the right of a vertical plane passing through the axis of the hub, as viewed from Fig. 3.

A link 154 is pivotally mounted at its upper end on the pin 153 and extends downwardly past the hub where it is engaged by coil springs 155. The lower end of the springs 155 are attached to the bar or swivel plate 156 which is pivoted on trunnions 157 socketed in bearings 158. In the illustrated form, there are ten springs 155 which engage the link 154, the link having the form of a Y as viewed in Fig. 2 and terminating in a bifurcated end 159 as clearly shown in Fig. 3.

When the gear segment 146 is in the position illustrated in Fig. 3, the springs 155 are under tension and exert a force through the link 154, arm 151, and hubs 149 and 148, tending to rotate the gear segment in a clockwise direction relative to Fig. 3. Upon release of the latching lever 103 through operation of the solenoid 126—127, as previously described, the sleeve 93 and shaft 83 are freed for rotation in a counter-clockwise direction relative to Figs. 3 and 5. Since the pinion 144 is connected to the shaft 83 through the clutch members 140 and 143 and meshes with the gear segment 146, the springs 155 will cause the shaft 83 to rotate in a counter-clockwise direction relative to Fig. 3, upon release of the lug 102 engaged by the lever 103, thereby causing the shaft I to rotate the camming roller 55 and open or close the switch as the case may be and in the manner previously described. Shaft 83 will thus continue to rotate until one of the lugs 102 has again reset the releasable latching lever 103.

In the illustrated mechanism for operating the switch shown in Fig. 1, the approximate ratio between the gear segment 146 and pinion 144 is four to one. Consequently, when the segment has moved to rotate the pinion four times, the switch shown in Fig. 1 will have been opened twice and closed twice. Obviously, the ratio may be varied to secure more or less operations of the switch. After the gear segment has moved its full distance the arm 151, link 154, and springs 155 will assume the broken line position shown in Fig. 3.

It will be noted that, when the springs 155 are fully extended, the leverage exerted through the arm 151 is at a minimum and that as the springs move the arm toward the broken line position, the leverage exerted rapidly increases, thus compensating for the decrease in the force which the springs exert on the arm and thereby maintaining a substantially uniform application of power delivered to the shaft 83.

*Rewinding mechanism for the stored energy mechanism*

It will be obvious from the foregoing disclosure, that after the gear segment 146 has moved sufficiently to position the pinion 144 relatively at the opposite end of the segment from that shown in Fig. 3, it becomes necessary to stop further switch operating movement of the segment 146 and to reset the mechanism so that it may again pass through its cycle of switch operations. Accordingly, I have provided what may be referred to as rewinding mechanism which will reset the stored energy means to the position shown in full lines in Fig. 3.

The rewinding mechanism comprises an arm 170 integral with the arm 151 on the hub 149 and having a spheroidal roller 171 mounted in the recessed area 172 on the arm 170 and rotatable on pin 173. The roller 171 contacts the cam 174 during winding operations, such contact starting at the low point 175 on the cam and continuing until the high point 176 on the cam has passed the roller 171. The arm 170 is shown in broken lines in Fig. 3 in which position the roller 171 contacts the low point 175 on the cam 174, the full line position being the position of the arm after the high point 176 on the cam has passed the roller 171.

The cam 174 is rotatably mounted on a stub shaft (not shown) extending between the division wall 97 and the depending panel 177. A hub 178 on the cam is splined to the hub 179 on the sprocket wheel 180 also rotatable on the stub shaft (not shown). The sprocket wheel 180 is connected by a sprocket chain 181 (shown diagrammatically) which passes over the smaller sprocket wheel 182. Sprocket wheel 182 is connected with the sprocket wheel 183, both of which are rotatable on stub shaft 184 journaled in division wall 97 and upstanding panel 185.

The sprocket wheel 183 is connected with a sprocket chain 186 (see Figs. 2 and 4) which passes through opening 187 (Fig. 3) and passes over the small sprocket wheel 188 (Figs. 2 and 4). The sprocket wheel 188 is mounted on a shaft 189 which extends into the casing 190 containing reduction gearing (not shown) driven by the electric motor 191. When the motor 191 is operated it will, through the described chain of mechanism including the sprocket wheel 180, rotate the cam 174 in a counter-clockwise direction relative to Fig. 2. Thus when the roller 171 on the arm 170 is in contact with any point between the low and high points 175 and 176 on the cam, the arm 170 will be moved downwardly relative to Fig. 3 and simultaneously move the segmental gear 146 and springs 155 through the arm 151 to the full line position shown in Fig. 3.

Obviously, when the segmental gear 146 is being returned to its full line position in Fig. 3, the pinion 144 must be free to rotate in a clockwise direction without rotating the shaft 83. As a matter of fact, the shaft 83 cannot be rotated by the pinion 144 in a clockwise direction because it is held against such rotation by the engagement of the catch 99 with the lug 96 on the sleeve 93. Consequently when the pinion 144 is rotated in a clockwise direction the clutch member 143 secured thereto will move the clutch member 140 toward the sleeve flange 95, thereby allowing the pinion to rotate freely without likewise rotating the shaft 83.

Control circuit for the rewinding motor 191

Fig. 9 illustrates an electric circuit (diagrammatically) for controlling the rewinding motor 191. This circuit is manually closed by the switch 200 to energize a solenoid operated double pole switch 201. The switch 200 is normally held in open position by spring means 202 and when it is in closed position the solenoid winding 203 is energized and the core 204 which is suitably connected to the switch blades of the double pole switch 201, moves the switch 201 to closed position. The switch 200 is then allowed to open. When the switch 201 is closed, a circuit is established through blade 205 and motor 191 and also through blade 206, wire 207, breaker switch 208, wire 209, and solenoid winding 203. When these two circuits are established, the switch 205 will be held in closed position as long as the winding 203 is energized and the motor 191 will continue to rotate.

As previously disclosed, the motor 191 drives the cam 174 (shown diagrammatically in Fig. 9) in a counter-clockwise direction. Secured to the side of the cam 174 adjacent the high point 176, is a pin 210 positioned to engage the upper end of the resilient blade 211 after approximately one complete revolution of the cam 174. Further movement of the cam will, through the pin 210, cause the blade 211 to leave the contact 212 and thereby break the circuit through winding 203. When the winding is de-energized, the core 204 will under the influence of a spring (not shown) move the double pole switch 201 to open circuit and break the circuit through the motor 191.

It will be noted that when the motor circuit is interrupted, the impetus of the moving mechanism driven by the motor will be sufficient to carry the pin 210 past the blade 211 and allow the latter to close. When the cam has assumed the position shown, the high point 176 will have passed the arm 170, thus permitting it to again move toward the low point 175 on the cam. Since the circuit through the winding 203 is also interrupted by the switch 200, the circuit therethrough will not be re-established by the switch 208.

It will be understood that the switch 200 may be located at any convenient point remote from the foregoing described devices. However, the solenoid 203—204 and switch 201 are located in the box shown at B in Fig. 3. Pivotally mounted on the box B is a biased lever C disposed in the path of movement of the pin 210 on the cam 174 and arranged to operate the breaker switch 208 which is also disposed in the box B.

Preferably the switch 131 shown in Fig. 8 and switch 200 shown in Fig. 9 are located at a central point where the operation of the switch G and the mechanism H may be controlled. In order to insure that the mechanism H is ready to work through a given number of switch operations, it is only necessary to operate the switch 200. Even though the apparatus is fully set, the rewinding mechanism will operate through its complete rewinding cycle. If the mechanism H has operated for only a portion of its switch operating cycle, the cam 174 will, during the rewinding operations, engage the arm 170 and reset the mechanism. In other words, regardless of whether or not the usable energy of the springs has been spent, operation of the rewinding mechanism will automatically reset the springs at their intended maximum power.

Operation

Assuming that after installation of the switch G and the switch operating mechanism H has been made, the springs 155 may be stressed, as indicated in Fig. 3, by operation of the rewinding mechanism described with particular reference to Fig. 9. Thereafter, the switch may be manually operated through the shaft 83 by means of a crank, in the manner previously described under the caption "Switch operating mechanism," to set the switch G in either its open or closed position as the starting point of the succeeding cycles of switch operation.

Thereafter each operation of the switch G is initiated by releasing the latching mechanism holding the lug 102 on sleeve 93, all specifically described in detail with reference to Figs. 5, 6, and 8 under the caption "Releasable latching mechanism for the shaft 83." Upon the completion of each cycle of switch movement to open or closed position, this latching mechanism immediately stops further delivery of power to the switch operating mechanism.

The workman controlling the release of the latching mechanism will of course know the number of times he has initiated switch operations and will when the total number of such operations available from the energy in the springs, initiate rewinding operations described with specific reference to Figs. 2, 3, 4, and 9 under the caption "Rewinding mechanism for the stored energy mechanism."

I claim:

1. In a device of the class described, the combination with a rotatable shaft, of a latch preventing rotation of said shaft in one direction and permitting rotation thereof in the opposite direction, releasable catch means normally preventing rotation of said shaft in said opposite direction and automatically effective after release for stopping said opposite rotation of said shaft a predetermined distance in said opposite direction, and operating mechanism for effecting rotation of said shaft upon release of said catch means.

2. In a device of the class described, the combination with a rotatable shaft, of a latch preventing rotation of said shaft in one direction and permitting rotation thereof in the opposite direction, releasable catch means normally preventing rotation of said shaft in said opposite direction and automatically effective after release for stopping said opposite rotation upon completion of a predetermined distance of opposite rotation, a pinion rotatable on said shaft including a clutch engageable therewith in the direction of said opposite rotation of said shaft and disengageable upon rotation of said pinion in said one direction, a pivotally mounted segmental gear meshing with said pinion, spring tensioned means urging said gear for rotation of said pinion in said opposite direction of said shaft, and spring tensioning mechanism rendering said spring tensioned means inoperative upon completion of a predetermined limit of pivotal movement of said gear in the rotation of said shaft, said spring tensioning mechanism being operative to tension said spring tensioned means a predetermined maximum and to thereafter permit operation thereof until said gear has completed its predetermined limit of movement.

3. In a device of the class described, the combination with a rotatable shaft, of latching mechanism normally holding said shaft against rotation, latch releasing means for releasing said shaft for rotation in one direction, said latching mechanism being operative to automatically stop rotation of said shaft upon the completion of a predetermined rotary movement thereof, a pinion on said shaft including a clutch engageable with said shaft in said one direction of rotation and disengageable in the opposite direction, a rotatable gear meshing with said pinion, spring means operative to rotate said gear and thereby rotate said pinion in said one direction, tension means for tensioning said spring means a predetermined maximum, said tensioning means permitting operation of said spring means between said predetermined maximum and a predetermined minimum tension of said spring means.

4. In a device of the class described, the combination with a rotatable element, of a latch holding said element against rotation in one direction, and a releasable catch holding said element against rotation in the opposite direction; said catch including a lug on said element, a pivoted lever extending into the path of movement of said lug, trip mechanism normally holding said lever in said path of movement, and means for tripping said mechanism.

5. In a device of the class described, the combination with a rotatable element, of a latch holding said element against rotation in one direction, and a releasable catch holding said element against rotation in the opposite direction; said catch including a lug on said element, a lever pivoted intermediate its ends to provide a lug engaging arm and a latching arm, toggle links comprising a link pivotally connected to said lug engaging arm and a link having a fixed pivot, said links being held in one relative position for latching said lever against pivotal movement and collapsible to another position for the release of said lever.

6. In a device of the class described, the combination with a rotatable element, of a latch holding said element against rotation in one direction, a releasable catch holding said element against rotation in the opposite direction; said catch including a lug on said element, a lever pivoted intermediate its ends to provide a lug engaging arm and a latching arm, toggle links comprising a link pivotally connected to said lug engaging arm and a link having a fixed pivot, said links being held in one relative position for latching said lever against pivotal movement and collapsible to another position for the release of said lever; and tripping mechanism for collapsing said links.

7. In a device of the class described, the combination with a rotatable element, of a latch holding said element against rotation in one direction, a releasable catch holding said element against rotation in the opposite direction; said catch including a lug on said element, a lever pivoted intermediate its ends to provide a lug engaging arm and a latching arm, toggle links comprising a link pivotally connected to said lug engaging arm and a link having a fixed pivot, said links being held in one relative position for latching said lever against pivotal movement and collapsible to another position for the release of said lever; and tripping mechanism for collapsing said links, said links including an element extending into the path of movement of said lug after release of said element, whereby upon predetermined movement of said element said lever will be reset for engagement with said lug.

8. In a device of the class described, a rotatable shaft, a latch holding said shaft against movement in one direction only, a clutch engageable with said shaft in the opposite direction and disengageable in the opposite direction, a pinion connected with said clutch, a segmental gear meshing with said pinion, a gear operating lever connected with said gear, spring means operating on said lever to rotate said gear and thereby said pinion in said opposite direction, rotatable cam means having low and high points of cam action, an arm integral with said lever disposed for contact with said cam between said low and high points, and means for rotating said cam, said cam in one position permitting free movement of said arm toward said low point thereon.

9. In a device of the character described, a rotatable shaft, a latch for holding said shaft against rotation in one direction only, rotatable spring actuated means interconnected with said shaft for rotation thereof opposite to said one direction and including a clutch releasable in said one direction, an arm on said spring actuated means, a cam in the path of movement of said arm, said cam in one position permitting free movement of said arm unobstructed by said cam for a predetermined distance, an electric motor interconnected with said cam for rotation thereof, said cam through the medium of said arm moving said spring actuated means to a position of predetermined maximum tensioning of said spring, and a circuit for said motor including a switch for closing the circuit through said motor, a solenoid for closing said switch, a manually operable switch for closing the circuit through said solenoid, the circuit through said solenoid being closed by the first mentioned switch when operated by said solenoid, a breaker switch normally in closed position in the circuit through said solenoid, and means on said cam for opening said breaker switch upon completion of effective cam movement on said arm.

10. In combination, a member rotatable about an axis of rotation and including a portion having a point of attachment displaced radially from said axis of rotation, said point of attachment being revoluble with said member about said axis of rotation, an anchorage more remote from said axis of rotation than said point of attachment, energy-storing spring means pivotally connected at one end to said member at said point of attachment, said spring means being connected at its other end to said anchorage, said member being rotatable to energize said spring means and thereafter rotatable by said spring means at the expense of the energy stored therein by the first rotation of said member, said spring means being designed to apply force to said member along a straight line interconnecting said anchorage and said point of attachment, power means operative to rotate said member for energizing said spring means, means operative automatically to stop said member at a predetermined angular position following rotation thereof by said power means, said point of attachment and said anchorage being disposed at opposite sides of a plane parallel to said axis of rotation when said member is stopped at said predetermined angular position, and releasable means operative normally to restrain said rotatable member against rotation by said spring means.

11. In combination, a member rotatable about an axis of rotation and including a portion having a point of attachment displaced radially from said axis of rotation, said point of attachment being revoluble with said member about said axis of rotation, an anchorage more remote from said axis of rotation than said point of attachment, tension spring means pivotally connected at one end to said member at said point of attachment, said tension spring means being connected at its other end to said anchorage, said member being rotatable to energize said spring means by tensioning the same and thereafter rotatable by said spring means at the expense of the energy stored therein by the first rotation of said member, power means operative to rotate said member for tensioning said spring means, means operative automatically to stop said member at a predetermined angular position following rotation thereof by said power means, said point of attachment and said anchorage being disposed at opposite sides of a plane parallel to said axis of rotation when said member is stopped at said predetermined angular position, and releasable latching means operative normally to restrain said rotatable member against rotation by said spring means.

12. In a spring-motor mechanism, a rotatable member, a pinion coaxial with said member, a one-way coupling interconnecting said member with said pinion whereby said member can be rotated in one direction only by said pinion, releasable latching mechanism normally restraining said member against rotation in said direction but operative upon release to permit rotation of said member in said direction, said latching mechanism being automatically returned to latching position upon initiation of rotation of said member, a gear meshed with said pinion for rotating the same, a spring arranged to be energized upon rotation of said gear in one direction, said spring being operative, when energized, to rotate said gear in the opposite direction, the last-mentioned direction of rotation of said gear being suitable to effect rotation of said rotatable member through said pinion and coupling, tripping means engageable with said mechanism for the release thereof, and power-driven cam mechanism for rotating said gear to energize said spring.

13. In combination: an element which is movable step-by-step in one direction, and releasable latching mechanism operative normally to restrain said element against movement in said direction, said releasable latching mechanism being actuable to release said element to permit movement thereof in said direction and automatically operative thereafter to arrest said movement upon completion of a predetermined step, said releasable latching mechanism including a toggle-like collapsible strut which in its normal uncollapsed posture is effective to obstruct movement of said element in said direction and to arrest the movement thereof at the completion of each step, but ineffectual so to do when collapsed, tripping means engageable with said strut for the collapse thereof, and means operatively co-ordinated with said element and effective during each step thereof in said direction to restore said strut to normal posture.

14. In combination: an element which is movable step-by-step in one direction, and escapement mechanism operative normally to restrain said element against movement in said direction, said escapement mechanism being actuable to release said element to permit movement thereof in said direction and automatically operative thereafter to arrest said movement upon completion of a predetermined step, said escapement mechanism including a toggle-like compression strut having a knee-joint situated intermediately of its length, said strut being collapsible in response to an over-center movement of said knee-joint, in one direction, and operative, only in normal uncollapsed posture to obstruct movement of said element in said direction and to arrest the movement thereof at the completion of each step, but ineffectual so to do when collapsed, and means actuable by said element during each step to effect a reverse over-center movement of said knee-joint and thereby restore said strut to normal posture.

15. In combination: an element rotatable step-by-step in one direction, and escapement mechanism operative normally to restrain said element against rotation in said one direction, said escapement mechanism being actuable to release said element to permit rotation thereof in said one direction and automatically operative thereafter to arrest said rotation upon completion of a predetermined step, said escapement mechanism comprising a lug carried by said element and projecting therefrom laterally of the axis of rotation of said element, said lug being revoluble with said element about said axis, a pivoted member normally disposed in the path of said lug and normally functioning as a stop for restraining said element against rotation in said one direction, said pivoted member being rotatable out of the path of said lug to permit rotation of said element, a toggle-like strut normally restraining said pivoted member against rotation, said strut being collapsible to release said pivoted member, thereby permitting rotation of said element in said direction, and means operative by said element during each rotational step thereof to restore said strut to its normal uncollapsed posture, the restoration of said strut being effective to rotate said member into the path of said lug.

16. In combination: an element rotatable step-by-step in one direction, and escapement mechanism operative normally to restrain said element against rotation in said one direction, said escapement mechanism being actuable to release said element to permit rotation thereof in said one direction and automatically operative thereafter to arrest said rotation upon completion of a predetermined step, said escapement mechanism comprising one or a plurality of angularly spaced lugs carried by said element and projecting therefrom laterally of the axis of rotation of said element, said lug or lugs being revoluble with said element about said axis, a pivoted member normally disposed in the path of said lug or lugs and normally functioning as a stop for restraining said element against rotation in said one direction, said pivoted member being rotatable out of said path to permit rotation of said element, a toggle-like strut normally restraining said pivoted member against rotation, said strut having a knee-joint intermediate of its length, said strut being collapsible in response to an over-center movement of said knee-joint, in one direction, to release said pivoted member and thus permit rotation thereof out of said path, said strut being restorable to normal uncollapsed posture by a reverse over-center movement of said knee-joint, said lug or lugs being operative individually and sequentially, during each step, to effect the aforesaid reverse over-center movement of said knee-joint.

ARTHUR M. TROGNER.